United States Patent
Elsherif et al.

(10) Patent No.: US 11,531,532 B2
(45) Date of Patent: Dec. 20, 2022

(54) REMOTE DEPLOYMENT OF PROVISIONED PACKAGES

(71) Applicant: VMware, Inc., Palo Alto, CA (US)

(72) Inventors: Mohamed Elsherif, Redmond, WA (US); Kishore Krishnakumar, Atlanta, GA (US); Ian Drennan, Atlanta, GA (US); Ondrej Stastny, Kirkland, WA (US); Brooks Peppin, Colorado Springs, CO (US); Jason Roszak, Brookhaven, GA (US); Ahmad Bilal, Renton, WA (US)

(73) Assignee: VMware, Inc., Palo Alto, CA (US)

( * ) Notice: Subject to any disclaimer, the term of this patent is extended or adjusted under 35 U.S.C. 154(b) by 49 days.

(21) Appl. No.: 16/249,214

(22) Filed: Jan. 16, 2019

(65) Prior Publication Data

US 2020/0225929 A1 Jul. 16, 2020

(51) Int. Cl.
| | |
|---|---|
| *G06F 8/65* | (2018.01) |
| *G06F 8/61* | (2018.01) |
| *H04L 67/00* | (2022.01) |
| *G06F 9/445* | (2018.01) |
| *H04L 41/0803* | (2022.01) |

(52) U.S. Cl.
CPC .............. *G06F 8/65* (2013.01); *G06F 8/61* (2013.01); *G06F 9/44505* (2013.01); *H04L 41/0803* (2013.01); *H04L 67/34* (2013.01)

(58) Field of Classification Search
CPC . G06F 8/60–66; G06F 9/45533–45558; G06F 2009/45562–45595; G06F 21/56–568; G06F 21/64–645; G06F 8/65; G06F 8/61; G06F 9/44505; H04L 41/0803; H04L 67/34
See application file for complete search history.

(56) References Cited

U.S. PATENT DOCUMENTS

| | | | |
|---|---|---|---|
| 8,950,007 B1* | 2/2015 | Teal | G06F 21/554 726/30 |
| 9,800,517 B1* | 10/2017 | Anderson | H04L 47/70 |
| 10,318,265 B1* | 6/2019 | To | H04L 67/34 |

(Continued)

OTHER PUBLICATIONS

McLay, Robert, et al. "Best practices for the deployment and management of production HPC clusters." SC'11: Proceedings of 2011 International Conference for High Performance Computing, Networking, Storage and Analysis. IEEE, 2011. (Year: 2011).*

(Continued)

*Primary Examiner* — S. Sough
*Assistant Examiner* — Joanne G Macasiano
(74) *Attorney, Agent, or Firm* — Thomas | Horstemeyer, LLP

(57) ABSTRACT

Disclosed are various approaches for remotely deploying provisioned packages. An installer for an application is stored in a cache location of the client device. A hash of the installer is then written to a registry of the client device. The installer is then executed to install the application on the client device. Then, the client device is registered with a management service. Subsequently, a registration confirmation is received from the management service. The hash of the installer is then confirmed and the installed application is identified to the management service as a managed application installed on the client device.

17 Claims, 3 Drawing Sheets

(56) References Cited

U.S. PATENT DOCUMENTS

| | | | | |
|---|---|---|---|---|
| 2012/0144383 A1* | 6/2012 | Mishra | ............... | G06F 11/1433 717/173 |
| 2013/0130651 A1* | 5/2013 | Deasy | ................... | H04L 63/105 455/411 |
| 2013/0263106 A1* | 10/2013 | Fuse | ........................ | G06F 8/61 717/168 |
| 2015/0193215 A1* | 7/2015 | Jianu | ........................ | G06F 8/61 717/177 |
| 2015/0222637 A1* | 8/2015 | Hung | ................... | H04L 67/146 726/1 |
| 2016/0378451 A1* | 12/2016 | Walker | ..................... | G06F 8/34 717/111 |
| 2017/0300689 A1* | 10/2017 | Phanse | ................... | G06F 21/60 |
| 2018/0041479 A1* | 2/2018 | Wang | ................. | H04L 63/0823 |

OTHER PUBLICATIONS

Matijasevic, Maja, and Gordan Jezic. "Monitoring Data Visualization and Agent-based Software Management for the Grid." (2005). (Year: 2005).*

* cited by examiner

REMOTE DEPLOYMENT OF PROVISIONED PACKAGES

BACKGROUND

Enterprises often provide employees with computing devices (e.g., laptops, desktops, tablets, smartphones, etc.) in order to perform their duties. These computing devices are often provisioned in advance so that the device is ready for the employee on his or her first day. For example, a computing device can be configured at the factory from an image that includes copies of an operating system, applications to be used by the employee, and various default settings or permissions. Unfortunately, these images are often updated infrequently (e.g., monthly, quarterly, semi-annually, or longer intervals). However, updates for software are often released much more frequently.

As a result, when a user first attempts to use his or her new computing device (e.g., when the user first logs onto the device), the device cannot be immediately ready for the user. For example, additional applications not installed at the factory can need to be pushed to the computing device for installation. Likewise, installed applications can attempt to retrieve updates. While additional applications are installed or updated, the user can be unable to make effective use of his or her computing device. In those instances where the applications are significantly large in size, the updates and installations that occur upon a user's first logon can take a significant period of time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for remotely deploying applications for installation prior to the first use of a computing device by a user. In some instances, the applications deployed can be installed at the factory as part of the device setup/configuration performed by the original equipment manufacturer (OEM) such as DELL, HP, LENOVO, or others. However, the applications mays also be deployed and installed at other points in time prior to the first use of the computing device by a user. As a result, the time that a computing device spends completing configuration when a user receives and first logs onto his or her computing device is greatly diminished.

Figure 1:
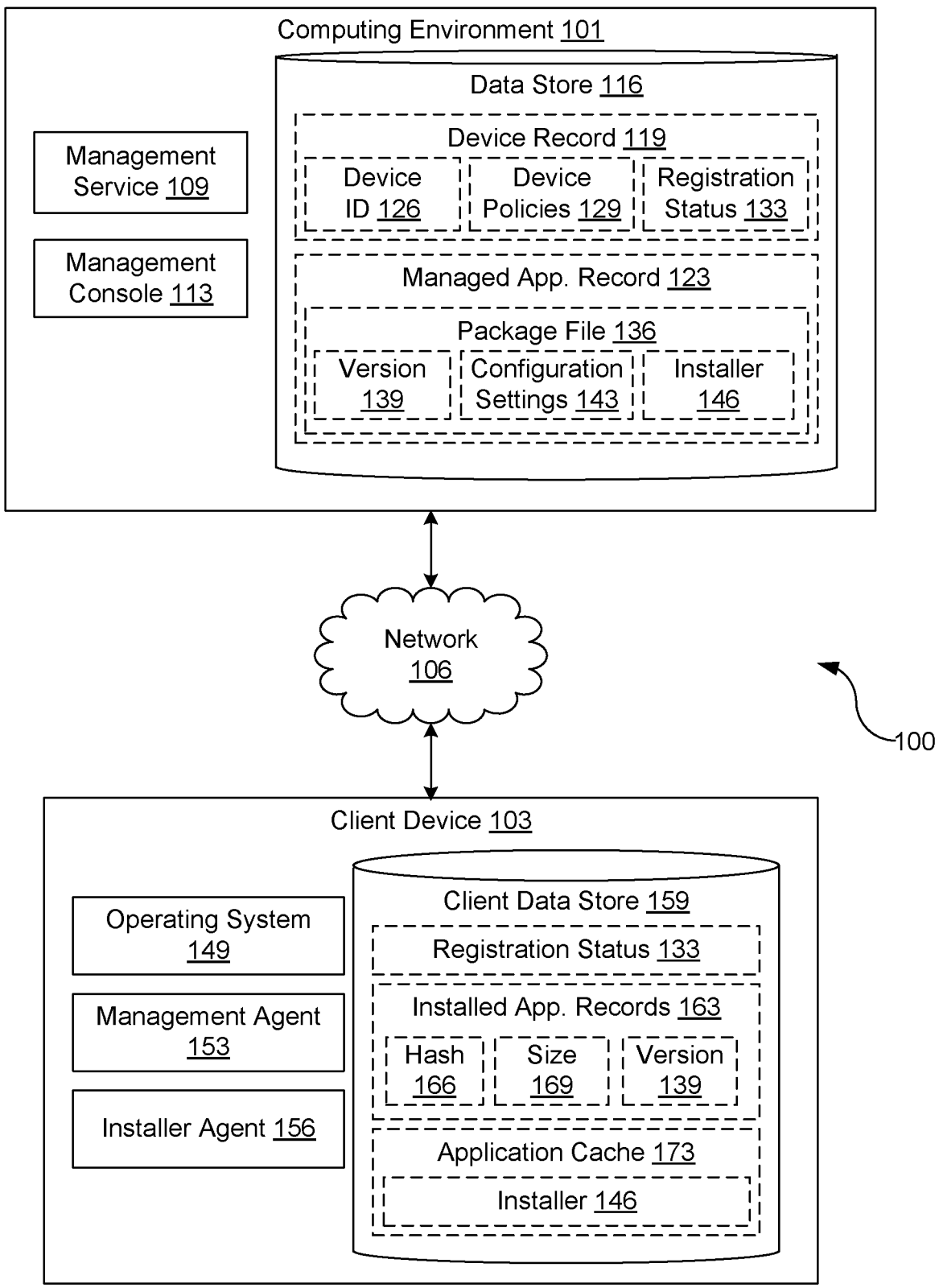
FIG. 1 is a drawing illustrating an example arrangement of a network environment according to various embodiments of the present disclosure.

With reference to FIG. 1, shown is a network environment 100 according to various embodiments. The network environment 100 includes a computing environment 103, and a client device 103, which are in data communication with each other via a network 106. The network 106 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 106 can also include a combination of two or more networks 106. Examples of networks 106 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged in one or more server banks or computer banks or other arrangements. Such computing devices can be located in a single installation or distributed among many different geographical locations. For example, the computing environment 103 can include a plurality of computing devices that together form a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103, for example, include a management service 109, a management console 113, and other applications, services, processes, systems, engines, or functionality not discussed in detail herein.

Also, various data is stored in a data store 116 that is accessible to the computing environment 103. The data store 116 can be representative of a plurality of data stores 116, which can include relational databases, object-oriented databases, hierarchical databases, hash tables or similar key-value data stores, as well as other data storage applications or data structures. The data stored in the data store 116 is associated with the operation of the various applications or functional entities described below. This data can include one or more device records 119, managed application records 123, and potentially other data.

The device record 119 can represent computing devices, such as client devices 103, owned or operated by an enterprise. Each device record 119 can include a device identifier 126, one or more device policies 129, and a registration status 133 for the respective computing device.

The device identifier 126 can represent any identifier that uniquely identifies a computing device or respective device record 119 with respect to another computing device or respective device record 119 within the enterprise. Examples of device identifiers 126 include media access control (MAC) addresses of network interfaces, serial numbers, international mobile equipment identifier (IMEI) numbers, globally unique identifiers (GUIDs), universally unique identifiers (UUIDS), and similar data structures.

Device policies 129 represent compliance policies applicable to a computing device identified by the device record 119 and enforced by the management service 109. Examples of device policies 129 include policies stating which users are authorized to use the computing device, which applications (or versions of applications) are authorized to be installed on the computing device, usage restrictions, and various other policies.

The registration status 133 can represent a Boolean value indicating whether a respective computing device is currently registered or otherwise enrolled with the management service 109. When the registration status 133 is set to indicate that a respective computing device is registered or enrolled with the management service 109, the management service 109 can attempt to enforce one or more device policies 129 for the respective computing device.

The managed application record 123 represents information related to an application that is managed by the management service 109. Applications can be considered to be managed by the management service 109 when various aspects of the status or configuration of the managed application on a registered client device 103 are managed by the management service 109. In contrast, an application can be considered to be unmanaged if installation, configuration, updates, and other aspects of control of the application are controlled by another individual, entity, or service.

The managed application record 123 can include various types of data related to an application that is managed by the management service 109. The managed application record 123 can include the name of an application, the publisher of the application, and potentially other information or data. For example, a managed application record 123 can include one or more package files 136, as well as other information. A package file 136 can represent a collection of an application and respective settings applicable to or installable on a client device 103. An example of a package file 136 is a Provisioning Package file used in MICROSOFT WINDOWS® systems. However, other types of systems can implement or use similarly formatted files for the same or similar purposes. These can include REDHAT Package Manager (RPM) files, DEBIAN Package files, Flatpak package files, AppImage package files, and Snap packages.

A package file 136 can include a version 139 of the application, one or more configuration settings 143 related to an application installable with the package file 136, and an installer 146 for the application. The configuration settings 143 represent how an application should be configured when installed using the installer 146. For example, the configuration settings 143 could specify various application settings to enable or disable or various application permission to enable or disable. The installer 146 represents a set of machine-readable instructions that, when executed, install an application to a client device 103. Examples of installers 146 include MICROSOFT WINDOWS® installer package (e.g., an MSI file), machine-readable installation script, and similar executables.

The management service 109 can be executed to administer the operation of client devices 103 registered or otherwise enrolled with the management service 109. To this end, the management service 109 can also provide mechanisms for a client device 103 to enroll or otherwise register with the management service 109. The management service 109 can also enforce the use of various device policies 129 or manage the installation of applications installed on client devices 103. For example, the management service 109 can enforce a device policy 129 stating that any managed client device 103 must have a specific or most recent version 139 of managed application installed.

The management console 113 can be executed to provide an administrative interface for configuring the operation of individual components in the network environment 100. For example, the management console 113 can provide an administrative interface for the management service 109. The management console 113 can also provide an interface for the configuration of device policies 129 or the creation and export of package files 136 to be installed on client device 103. Accordingly, the management console 113 can correspond to a web page or a web application provided by a web server hosted in the computing environment 103.

The client device 103 is representative of a plurality of client devices that can be coupled to the network 106. The client device 103 can include, for example, a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 103 or can be connected to the client device 103 through a wired or wireless connection. The client device 103 can also be configured to execute various applications such as an operating system 149, a management agent 153, an installer agent 156, and potentially other client applications.

The operating system 149 is system software that can be executed to manage hardware and software resources of the client device 103 and provide common services for applications executed by the client device 103. This can include facilities that identify and segregate or separate processes and resources belonging to multiple users and limiting user access to those processes and resources that belong to the user or to which the user has been granted permission. Examples of operating systems include various versions of MICROSOFT WINDOWS®, APPLE MACOS®, FREEBSD®, NETBSD®, various distributions of GNU/Linux (e.g., UBUNTU®, REDHAT®, etc.), APPLE IOS®, GOOGLE ANDROID®, and similar systems.

The management agent 153 can be executed to interact with the management service 109 on behalf of the client device 103. For example, the management agent 153 can be used to register the client device 103 with the management service 109, maintain data communication with the management service 109 and enforce the device policies 129 received from the management service 109. For instance, the management agent 153 can maintain (e.g., update, reconfigure, uninstall, etc.) managed applications installed on the client device 103 according to one or more device policies 129.

The installer agent 156 can be installed by an OEM on the client device 103 during the factory configuration of the client device 103. The installer agent 156 can be executed during the factory configuration to install or more applications from one or more exported package files 136. Installation applications can be configured by the installer agent 156 to allow for the installed applications to be treated as managed applications once the management agent 153 registers with the management service 109 and enrolls the client device 103 with the management service 109. In some instances, the installer agent 156 can also install and configure the management agent 153, such that the management agent 153 attempts to connect to the management service 109 and register the client device 103 with the management service 109 when an employee first logs onto the client device 103.

The client device 103 can also have a client data store 159 accessible to applications executing on the client device 103. The client data store 159 can include relational databases, object-oriented databases, hierarchical databases, hash tables or similar key-value data stores, as well as other data storage applications or data structures. The data stored in the client data store 159 is associated with the operation of the various applications or functional entities described below. This data can include the registration status 133 of the client device 103, installed application records 163, an application cache 173, and potentially other data.

The installed application records 163 represent installation information of applications installed by the installer agent 156 or the management agent 153. An installed application record 163 can include a hash 166 of the installer 146 used to install an application, the size 169 of the installer 146 of the application, the version 139 of the application installed, and various other data. The hash 166 can be either a cryptographic hash or other type of hash value that uniquely identifies a specific version of an installer 146 file or package compared to other installers 146 of other applications or other versions of the same application. The size 169 represents the size of the installer 146 used to install an application. The size 169 can be stored in bytes, kilobytes, megabytes, gigabytes, or other measures of size.

The application cache 173 represents a cache on the client device 103 where installers 146 can be stored by the installer agent 156 or the management agent 153. Installers 146 can be kept in a cache for a number of reasons. For example, an installer 146 can be kept in the application cache 173 to allow for reinstallation of an application, uninstallation of the application, or to upgrade the application to a new version 139.

Next, a general description of the operation of the various components of the network environment 100 is provided. More specific and detailed descriptions of the individual components of the network environment 100.

To begin, an administrative user for an enterprise can create one or more package files 136 for one or more managed applications. For example, the administrative user can manipulate a user interface provided by the management console 113 (e.g., a web page) to see a list of applications that are currently managed by the management service 109. The list of currently managed applications can be assembled by querying the data store 116 and retrieving information stored in the managed application records 123 (e.g., name of application, version 139 of application, publisher or author of application, etc.) to present to the administrative user.

The administrative user can then use the management console 113 to create individual package files 136 for selected managed applications. The management service 109 can then create package files 136 for the selected managed applications. Individual package files 136 can then be stored in respective managed application records 123 by the management service 109.

Subsequently, the administrative user can export one or more package files 136 to an OEM. In some instances, the administrative user can select individual package files 136 through the management console 113 and have the management console 113 send the selected package files 136 to the OEM using a service provided by the OEM. In other instances, the administrative user can have to manually download individual package files 136 and provide them to the OEM using a tool provided by the OEM.

Later, the OEM receives a request for a device from the enterprise for a client device 103. The OEM can then configure the client device 103 at its facility. For example, the OEM can load package files 136 previously provided by the administrative user into the client data store 159 and a copy of the installer agent 156 previously supplied to the OEM.

The installer agent 156 then installs and configures managed applications using the package files 136 previously exported to the OEM and loaded onto the client device 103. For example, the installer 156 can unpack the package file 136 for an application, execute the installer 146, and apply the configuration settings 143 set forth in the package file 136. Once installation of the managed application is complete, the installer agent 156 can place the installer 146 in the application cache 173 and record the hash 166 of the installer 146, the size 169 of the installer 146, and the version 139 of the installer 146 in an installed application record 163. After the installer agent 156 has processed every package file 136 provided to it, the installer agent 156 can then install a copy of the management agent 153. However, in other implementations, the management agent 153 can be separately and independently installed by the OEM.

Subsequently, the client device 103 is shipped to the user, who will power on the client device 103 and logon to the client device 103 for the first time. When the user logs onto the client device 103, the management agent 153 executes and connects to the management service 109. The management agent 153 can enroll or register with the management service 109 (e.g., by providing the username and password submitted by the employee to the management service 109).

As part of the enrollment process, the management service 109 may create a device record 119 for the client device 103 that includes the device identifier 126 provided by the client device 103 as part of the enrollment process, as well as one or more applicable device policies 129. The current registration status 133 may also be updated. In addition, a certificate can be generated as part of the enrollment process, which can be provided to the client device 103 for future authentication with the management service 109. The certificate can be generated by the management service 109 itself or the certificate authority. The certificate 139 can be provided to the client device 103 as part of a profile or policy sent to the client device 103 upon completion of the enrollment process. However, in some implementations, the certificate can be generated by the client device 103 and provided to the management service 109 as part of the enrollment process. In these implementations, the certificate may be stored by the management service 109 for future use or reference by the management service 109 or the certificate authority 119.

The management agent 153 can then receive a registration confirmation and update the registration status 133 in the client data store 159 to reflect that the client device 103 is now enrolled with the management service 109. Likewise, the management agent 153 may save to the client data store 159 any certificates provided by the management service as part of the enrollment or registration process.

After receiving the registration confirmation, the management agent 153 can then receive an application identifier for each managed application to be installed on the client device 103. For each managed application identified by the application identifier, the management agent 153 can confirm that the installer 146 is located in the application cache 173. The management agent 153 can also determine the hash 166, the size 169, and the version 139 of the installer 146 stored in the application cache 173. If the computed values match, then the management agent 153 can determine that the application installed using the installer 146 is a managed application. The management agent 153 can then maintain the managed application according to applicable device policies 129 (e.g., automatically update to a newer version specified in a device policy 129, etc.).

Figure 2:
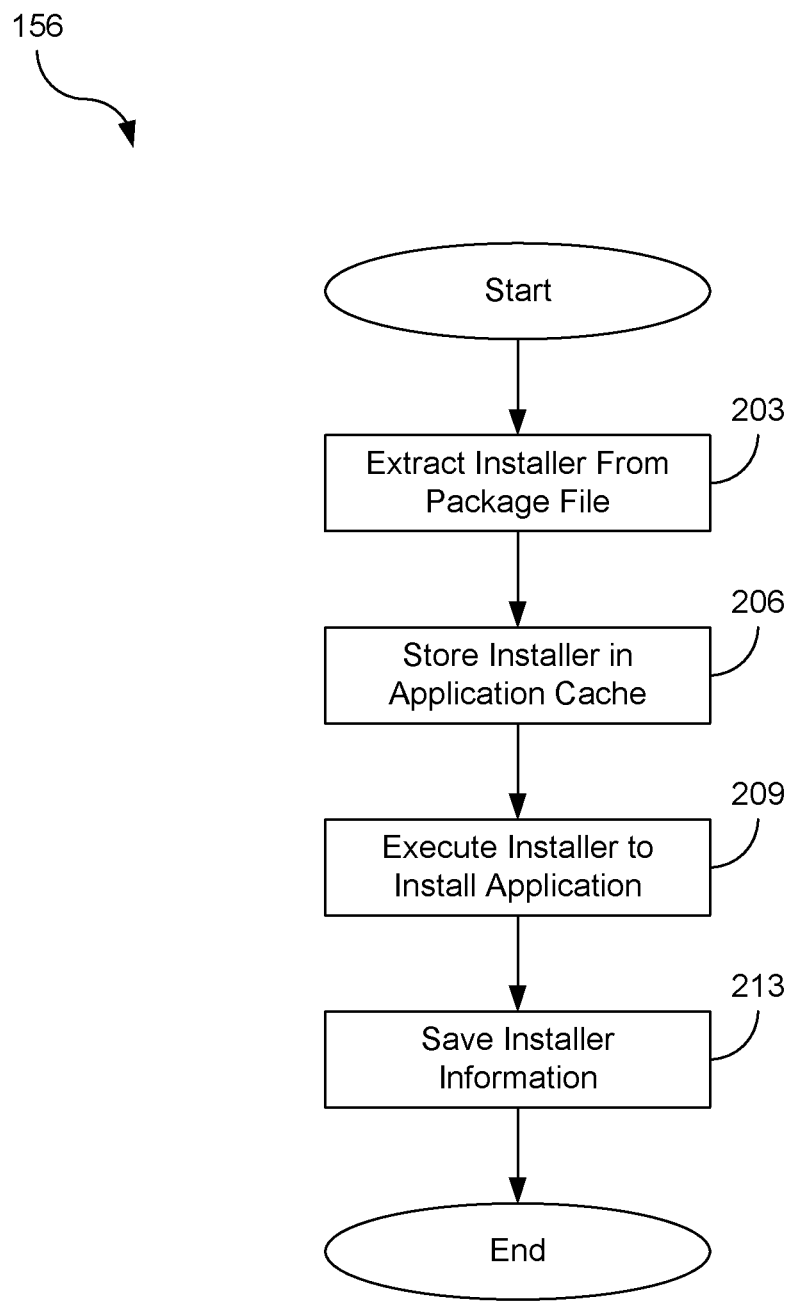
FIG. 2 is a flowchart depicting the operation of a component of the present disclosure.

Referring next to FIG. 2, shown is a flowchart that provides one example of the operation of a portion of the installer agent 156. It is understood that the flowchart of FIG. 2 provides merely an example of the many different types of functional arrangements that can be employed to implement the operation of the installer agent 156. As an alternative, the flowchart of FIG. 2 can be viewed as depicting an example of elements of a method implemented by the client device 103.

Beginning at step 203, the installer agent 156 can extract an installer 146 from a package file 136 placed on the client device 103. For example, the installer agent 156 can unzip the package file 136 to access the installer 146 included in the package file 136.

Then at step 206, the installer agent 156 copies the installer 146 from the package file 136 and places the installer 146 in the application cache 173. In some instances, the location of the application cache 173 can be a predefined location in the client data store 159 or a location specified by an OEM technician when the installer agent 156 is first loaded onto the client device. In alternative implementations, the installer agent 156 can query the operating system 149 or the management agent 153 for the location of the application cache 237.

Next at step 209, the installer agent 156 invokes or otherwise executes the installer 146, thereby causing the installer 146 to install a corresponding application on the client device 103. The installer agent 156 can execute the installer 146 in a number of ways. For example, the installer agent 156 can pass a number of command line arguments to a command prompt or shell provided by the operating system 149. As another example, the installer agent 156 can invoke a function of an application programming interface (API) provided by the installer 146.

Subsequently at step 213, the installer agent 156 saves information about the installer 146 in the client data store 159. For example, the installer agent 156 can create an installed application record 163 representing the application installed with the installer 146. The installed application record 163 could include the hash 166 of the installer 146, the size 169 of the installer, the version 139 of the installer 146, and potentially other information (e.g., the name of the application installed, etc.). Once installation is complete, the process ends.

Figure 3:
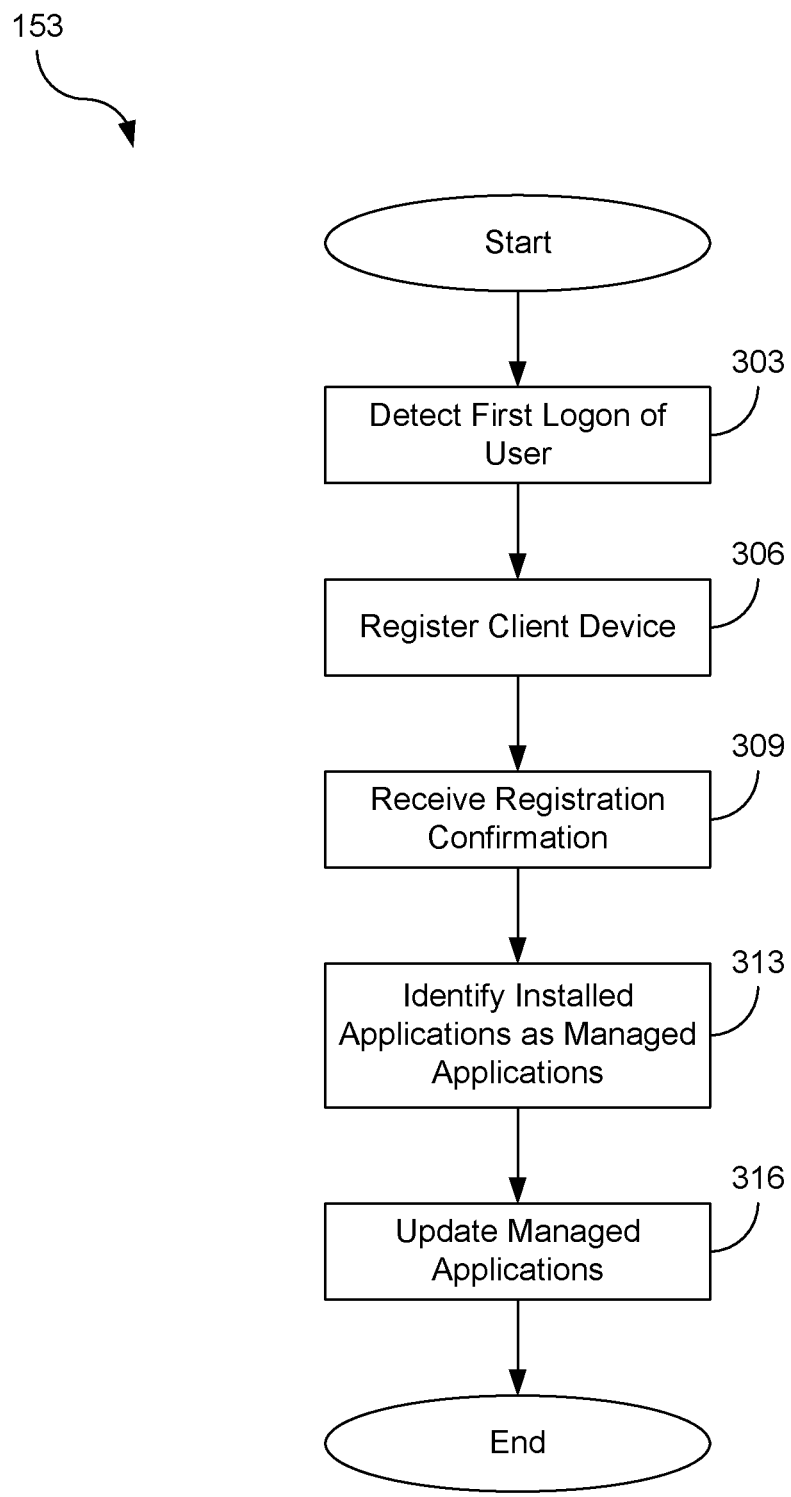
FIG. 3 is sequence diagram depicting the interaction between components of the present disclosure.

Referring next to FIG. 3, shown is a flowchart that provides one example of the operation of a portion of the management agent 153. It is understood that the flowchart of FIG. 3 provides merely an example of the many different types of functional arrangements that can be employed to implement the operation of the management agent 153. As an alternative, the flowchart of FIG. 3 can be viewed as depicting an example of elements of a method implemented by the client device 103.

Beginning at step 303, the management agent 153 detects a first logon to the client device 103 by a user. For example, the management agent 153 can be registered with a logon service or daemon to receive events or notifications of when a logon occurs. When the management agent 153 receives a notification that a user is logging on to the client device 103, the management agent 153 can check logon history or similar records maintained by the management agent 153 to determine whether or not the user, or any user, has logged onto the client device. The logon history could be a simple Boolean value to indicate whether any user has previously logged onto the client device 103, a per user Boolean value to indicate whether individual users have previously logged onto the client device 103, or a more detailed history of logon events.

Then at step 306, in response to detecting the first logon event, the management agent 153 sends a registration request to the management service 109. The registration request can include a device identifier 126 for the client device 103, as well as the user credentials submitted during the logon process or credentials derived from the user credentials submitted during the logon process (e.g., a token). In order to register with the correct management service 109, the management agent 153 can be configured by the OEM during installation of the management agent 153 to connect to a predefined management service 109 located at a predefined network address (e.g., internet protocol (IP) address, uniform resource locator (URL), etc.).

Next at step 309, the management agent 153 receives a confirmation from the management service 109 that the client device 103 has been registered with the management service 109. In response, the management agent 153 can update the registration status 133 to reflect that the client device is currently registered with the management service 109. The management agent 153 can also download one or more device policies 129 from a command queue maintained by the management service 109 and perform other post-registration activities.

Proceeding to step 313, the management agent 153 identifies which installed applications are managed applications. For example, the management agent 153 can search the client data store 159 for installed application records 163 or the application cache 173 for the presence of installers 146. For each installed application record 163, the management agent 153 can also confirm that there is a respective installer 146 in the application cache 173. Similarly, for each installer 146 found in the application cache 173, the management agent 153 can also verify that there is a respect installed application record 163. Moreover, the management agent 153 can verify that the hash 166 of the installer 146, the size 169 of the installer 146, and the version 139 of the installer 146 match the hash 166, size 169, and version 139 values stored in the respective installed application record 163 for the installer 146. Assuming that the hash 166, size 169, and version 139 match for the installer 146, then the management agent 153 can identify the installed application to the management service 109 as a managed application installed on the client device 103.

Subsequently at step 316, the management agent 153 can receive an update from the management service 109 for one or more managed applications installed on the client device 103. For example, the management agent 153 may send a request to the management service 109 for any commands stored in a command queue associated with the client device 103. The command queue may be stored, for example, in the data store 116. In response, the management agent 153 can received one or more commands stored in the command queue. As an example, the command can include an instruction to update the managed application specified by the command. The command may also include an updated version of the installer 146 or package file 136. The management agent 153 can apply the update (e.g., but executing more recent installer 146 provided by the management service 109). The management agent 153 may also update the respective installed application record 163 once the update is completed. The management agent 153 can also store the installer 146 in the application cache 173 in some implementations.

Although the management service 109, the management console 113, the management agent 153, the installer agent 156, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    a computing device comprising a processor and a memory;
    machine-readable instructions stored in the memory that, when executed by the processor, cause the computing device to at least:
        obtain a package file comprising an installer for an application, the package file exported from a network environment associated with an enterprise;
        store the installer for the application in a cache location of the computing device;
        write a hash of the installer to a registry of the computing device;
        execute the installer from the cache location to install the application on the computing device;
        store a management agent in a location of the computing device, the management agent configured to communicate with a management service of the network environment;
        execute the management agent from the location to register the computing device with the management service;
        receive a registration confirmation from the management service;
        confirm the hash of the installer;
        identify, by the management agent, the application to the management service as a managed application installed on the computing device based at least in part on a search of the cache location for the installer;
        in an instance in which a device policy specifies an updated version of the managed application, send a request to the management service for the updated version of the managed application;
        receive from the management service an updated version of the installer; and
        execute the updated version of the installer to install the updated version of the managed application on the computing device.

2. The system of claim 1, wherein the management agent is executed in an instance in which a first logon event for the computing device is identified.

3. The system of claim 1, wherein the machine-readable instructions, when executed by the processor, further cause the computing device to at least:
    write a version number of the installer to the registry of the computing device;
    confirm the version number of the installer in response to receipt of the registration confirmation; and
    wherein identification of the application as the managed application occurs in response to confirmation of the version number of the installer.

4. The system of claim 1, wherein the machine-readable instructions, when executed by the processor, further cause the computing device to at least write a size in bytes of the installer to the registry of the computing device.

5. The system of claim 1, wherein the machine-readable instructions, when executed by the processor, further cause the computing device to unpack the installer from the package file.

6. The system of claim 5, wherein the package file is a version of a provisioning package file.

7. A method, comprising:
   obtaining a package file comprising an installer for an application, the package file exported from a network environment associated with an enterprise;
   storing the installer for the application in a cache location of a client device;
   writing a hash of the installer to a registry of the client device;
   executing the installer from the cache location to install the application on the client device;
   storing a management agent in a location of the client device, the management agent configured to communicate with a management service of the network environment;
   executing the management agent from the location to register the client device with the management service;
   receiving a registration confirmation from the management service; confirming the hash of the installer;
   identifying, by the management agent, the application to the management service as a managed application installed on the client device based at least in part on a search of the cache location for the installer;
   in an instance in which a device policy specifies an updated version of the managed application, sending a request to the management service for the updated version of the managed application;
   receiving from the management service an updated version of the installer; and
   executing the updated version of the installer to install the updated version of the managed application on the client device.

8. The method of claim 7, wherein the management agent is executed in an instance in which a first logon event for the client device is identified.

9. The method of claim 7, further comprising:
   writing a version number of the installer to the registry of the client device;
   confirming the version number of the installer in response to receiving the registration confirmation; and
   wherein identifying the application as the managed application occurs in response to confirming the version number of the installer.

10. The method of claim 7, further comprising:
    writing a size of the installer to the registry of the client device;
    confirming the size of the installer in response to receiving the registration confirmation; and
    wherein identifying the application as the managed application occurs in response to confirming the size of the installer.

11. The method of claim 7, further comprising unpacking the installer from the package file.

12. The method of claim 11, wherein the package file is a version of a provisioning package file.

13. A non-transitory, computer-readable medium comprising machine-readable instructions that, when executed by a processor, cause a computing device to at least:
    obtain a package file comprising an installer for an application, the package file exported from a network environment associated with an enterprise;
    store the installer for the application in a cache location of the computing device;
    write a hash of the installer to a registry of the computing device;
    execute the installer from the cache location to install the application on the computing device;
    store a management agent in a location of the computing device, the management agent configured to communicate with a management service of the network environment;
    execute the management agent from the location to register the computing device with the management service;
    receive a registration confirmation from the management service;
    confirm the hash of the installer;
    identify, by the management agent, the application to the management service as a managed application installed on the computing device based at least in part on a search of the cache location for the installer;
    in an instance in which a device policy specifies an updated version of the managed application, send a request to the management service for the updated version of the managed application;
    receive from the management service an updated version of the installer; and
    execute the updated version of the installer to install the updated version of the managed application on the computing device.

14. The non-transitory, computer-readable medium of claim 13, wherein the management agent is executed in an instance in which a first logon event for the computing device is identified.

15. The non-transitory, computer-readable medium of claim 13, wherein the machine-readable instructions, when executed by the processor, further cause the computing device to at least:
    write a version number of the installer to the registry of the computing device; confirm the version number of the installer in response to receipt of the registration confirmation; and
    wherein identification of the application as the managed application occurs in response to confirmation of the version number of the installer.

16. The non-transitory, computer-readable medium of claim 13, wherein the machine-readable instructions, when executed by the processor, further cause the computing device to at least write a size in bytes of the installer to the registry of the computing device.

17. The non-transitory, computer-readable medium of claim 13, wherein the machine-readable instructions, when executed by the processor, further cause the computing device to unpack the installer from the package file.

* * * * *